US012144083B2

(12) United States Patent
Larribe

(10) Patent No.: US 12,144,083 B2
(45) Date of Patent: Nov. 12, 2024

(54) MULTI-BRANCH LIGHT SYSTEM WITH CURRENT BALANCING AND FAILURE INDICATION

(71) Applicant: VALEO VISION, Bobigny (FR)

(72) Inventor: Sylvain Larribe, Troy, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/307,849

(22) Filed: Apr. 27, 2023

(65) Prior Publication Data

US 2024/0215137 A1 Jun. 27, 2024

Related U.S. Application Data

(60) Provisional application No. 63/434,734, filed on Dec. 22, 2022.

(51) Int. Cl.

*H05B 47/21* (2020.01)
*H05B 45/35* (2020.01)
*H05B 45/46* (2020.01)
*H05B 45/52* (2020.01)

(52) U.S. Cl.

CPC ............. *H05B 47/21* (2020.01); *H05B 45/35* (2020.01); *H05B 45/46* (2020.01); *H05B 45/52* (2020.01)

(58) Field of Classification Search

CPC ........ H05B 47/21; H05B 45/35; H05B 45/46; H05B 45/50-52; F21V 23/0457; G05F 3/267

See application file for complete search history.

(56) References Cited

U.S. PATENT DOCUMENTS 9,713,212 B2 * 7/2017 Hui ........................... G05F 3/16
10,698,435 B1 6/2020 Boivin
2014/0062314 A1 3/2014 Moskowitz
2014/0265839 A1 * 9/2014 Anand .................. H05B 45/58 315/77
2016/0095194 A1 * 3/2016 Yoneoka ............... H05B 45/58 315/121
2017/0150572 A1 * 5/2017 Zhang ................. G09G 3/3406

FOREIGN PATENT DOCUMENTS

WO 2017025026 A1 2/2017
WO 2017025027 A1 2/2017
WO 2021186467 A1 9/2021

* cited by examiner

*Primary Examiner* — Renan Luque
(74) *Attorney, Agent, or Firm* — Young Basile Hanlon & MacFarlane, P.C.

(57) ABSTRACT

A light system including: light branches extending in parallel to one another with each of the light branches have lights that provide light to a region around a vehicle, the light branches include: a primary light branch include: a bias circuit and a switch; and secondary light branches that are controlled by the primary light branch; wherein electricity is provided to the light branches and when all of the lights on the light branches are operating properly the electricity maintains the switch in a closed position; and when any of the lights fail or are not operating properly, electricity is prevented from extending through the light branch, by the lights that have failed, and the electricity continues to extend through the light branches that are operating properly so that the electricity that extends to the switch is not sufficient to maintain the switch in the closed position.

20 Claims, 3 Drawing Sheets

MULTI-BRANCH LIGHT SYSTEM WITH CURRENT BALANCING AND FAILURE INDICATION

CROSS-REFERENCE TO RELATED APPLICATION(S)

This application claims priority to U.S. Provisional Application No. 63/434,734, filed on Dec. 22, 2022, the entire disclosure of which is hereby incorporated by reference.

FIELD

The present teachings relate to a multi-branch light system where a current balancer provides a same amount of electricity to each branch and if one light on one of the branches burns out or fails all of the branches are turned out to indicate a failure or that a burn out has occurred.

BACKGROUND

Vehicles include many different types of lights. Some types of light systems included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. The light systems may include a single bulb or a branch with multiple bulbs where the light from the multiple bulbs combine together to meet a lighting standard for vehicles.

Examples of light systems may be disclosed in U.S. Pat. No. 10,698,435; U.S. Patent Application Publication No. 2014/0062314; and International Publication No. WO2017025026 and WO2021/186467 all of which are expressly incorporated herein by reference for all purposes. Thus, there is a need for a system with branches where each of the branches include two or more lights. There is a need for a system where all of the lights operate properly by alerting users to a defective condition where all of the lights are turned off. There is a need for a system and method where all of the lights turn off to indicate that a fault, failure, or a light in one or more branches of the system have failed. It would be desirable to also have a system where if one light in the three or more branches fail, then all of the lights in the branches fail.

SUMMARY

The present teachings provide: a light system comprising: light branches extending in parallel to one another with each of the light branches comprising lights that provide light to a region around a vehicle, the light branches comprising: a primary light branch comprising: a bias circuit and a switch; and secondary light branches that are controlled by the primary light branch; wherein electricity is provided to the light branches and when all of the lights on the light branches are operating properly the electricity maintains the switch in a closed position; and when any of the lights fail or are not operating properly, electricity is prevented from extending through the light branch, by the lights that have failed, and the electricity continues to extend through the light branches that are operating properly so that the electricity that extends to the switch is not sufficient to maintain the switch in the closed position.

The present teachings provide: a method comprising: providing electricity to a light system of a vehicle; directing the electricity along a plurality of light branches within the light system so that one or more lights on each of the plurality of light branches provide light, the plurality of light branches extending parallel with one another; maintaining a switch within a primary light branch, of the plurality of light branches, in a closed position by providing a switch current when all of the one or more lights on each of the plurality of light branches are operating properly; and turning the switch to an open position by providing less than the switch current when one of the one or more lights on one of the plurality of light branches fail or are not operating properly.

The present teachings provide a system with branches where each of the branches include two or more lights. The present teachings provide a system where all of the lights operate properly by alerting users to a defective condition where all of the lights are turned off. The present teachings provide a system and method where all of the lights turn off to indicate that a fault, failure, or a light in one or more branches of the system have failed. The present teachings provide a system where if one light in the three or more branches fail then all of the lights in the branches fail.

DETAILED DESCRIPTION

Figure 1A:
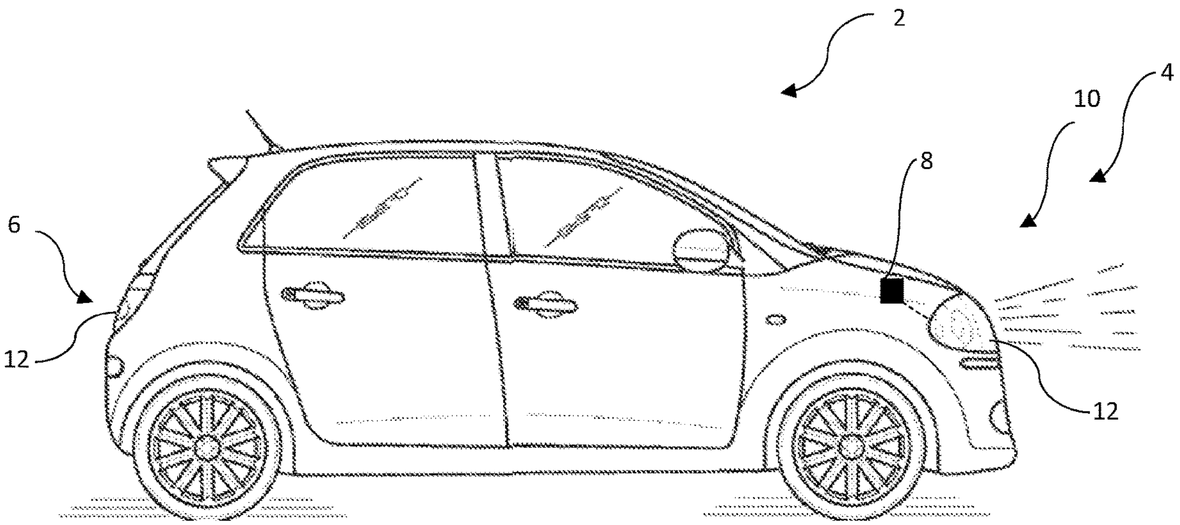
FIG. 1A is a side view of a vehicle including light systems.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle.

The light system may direct some light at the ground. The light system may direct some light above the ground. The light system may be integrated into a front end, a rear end, or both of a car. The light system may provide enough light to meet a vehicle standard, a lighting standard (e.g., IIHS), a governmental standard, a test standard, an international standard, a predetermined amount of light, or a combination thereof. The light system may be an assembly. The light system may be a sealed light system that is integrated into a vehicle. The light system may be a sub-assembly that is included in a larger light system. The light system may be integrated into another light system and may function to be part of the light system. The light system may project light out of the vehicle. The light system may include multiple different lights or light sub-systems that each provide a different function. The light systems may be or include two or more branches of lights, three or more branches of lights, four or more branches of lights, or even five or more branches of lights. The light system may have multiple light branches that powered in parallel. The light systems may be covered by one or more outer lenses or may be free of an outer lens.

The outer lens may form an outer most surface of the light system. The outer lens may function to protect all or a portion of the light system. The outer lens may be free of covering an illuminated component. The outer lens may be clear. The outer lens may have a color. The outer lens may provide a color to clear lights within the light system.

The light sources function to produce light, direct light into a reflector, direct light through a collimator, direct light into a light redirecting device, or a combination thereof. The light source may be a device or a plurality of devices that create light and the light extends outward from the light source. The light source may produce a high beam, a low beam, a blending beam, a running light, a daytime light, a turn signal, a brake light, a warning light, a communication, ornamentation, a signal, decoration, or a combination thereof. The light sources may have different functions. For example, one light source may provide a running light, another light source may be a turn signal, and another light source may provide a signal, communication, decoration, or ornamentation. The light source may comprise a plurality of lights or may be a single light source within a set of light sources. The plurality of lights may be in one set or group of light sources. The light source may be a single light that projects light. In another example, a light source may direct light in a first direction. The light sources may be groups of light sources that all direct light to perform a function or to create some indication. The light sources may located along branches.

The branches may be a light branch that includes one or more light sources or two or more light sources. Each branch may operate separate form an adjacent branch. One branch may be in series with one or more another branches. For example, if one branch including light sources fails than the corresponding one or more another branches may fail as well. One branch may be parallel to one or more additional branches. For example, if one light or one branch fails the corresponding one or more another branches may not fail and may continue to provide light. The light branches may each provide a predetermined amount of light. Each of the light branches may provide a same amount of light. The light branches may provide different amounts of light. The light branches may balance an amount of light extending out of the light system. For example, if the light system has an irregular shape or has a dimension then one branch may extend beyond other branches to provide light throughout the light system. The light branches may include primary light branches and secondary light branches.

The primary light branches may: include a controller, a control circuit, be directly controlled by a controller, be monitored by a controller, may be in series will the other branches, include a switch, or a combination thereof. The primary light branch may monitor a status of the other light branches. The primary light branch may be in parallel to all of the other light branches. The primary light branch be identical to the secondary light branch. The primary light branch may include or be connected to a bias circuit. The primary light branch may include one or more switches such that when the switch is in the on position the primary light branch and all of the secondary light branches are provided with current. The primary light branch may include a single switch. The light system may only include one primary light branch. The primary light branch may include one or more switches such that when the switch is in the off position the primary light branch and all of the secondary light branches are prevented from being powered (e.g., all of the lights on the light branches will be off).

The secondary light branch functions to provide current to one or more lights or two or more lights located along the secondary light branch. The secondary light branches may include lights and when electricity (e.g., power and current) is provided the lights turn on to provide light, and when electricity is not provided the lights are not lit. The secondary light branches may all provide substantially equal amounts of light (e.g., similar lumens). The secondary light branches may all extend in parallel so that if a light on one of the light branches fails, current may not be provided to the other secondary light branches. The secondary light branches may each include one or more lights or light sources or plurality of lights or light sources.

The light sources may be any type of lighting device that produces light such as an incandescent bulb, fluorescent light, compact fluorescent lamp, halogen lamp, light emitting diode (LED), high intensity discharge lamps (HID); halogen lights, xenon lights, a laser diode, phosphorous bulb, or a combination thereof. The preferred light source may be a light emitting diode (LED) or two or more light emitting diodes (LEDs) on each branch. The light source may be a single lamp or bulb. Preferably, the light source is part of a set of light sources that includes a plurality of lamps, bulbs, diodes, or a combination thereof. The light source may be part of a set of light sources that includes 2 or more, 3 or more, 4 or more, 5 more, 7 or more, 9 or more, or 11 or more lights that produce light and combine together to form the light extending from the light system. The sets of light sources may include 20 or less, 18 or less, 16 or less, or 14 or less lights that produce light (e.g., each set may include 8 light sources or alternatively all of the sets when combined together may include 8 light sources or 2 light sources). The number of light sources in a part of the light may dependent upon a size of the region or a size illuminated, a number of branches, or both. Thus, the light source may be one or more lights, two or more lights, or three or more lights. The light source may be static. The light sources may be free of movement. The light source may be fixed. The light sources may be static and may be manually or physically adjusted by adjusting the light system so that the light sources are directed to a desired location. The light sources may be fixed and the light from the light source may be moved, bent, directed, or a combination thereof by optical elements, textured portions, micro-optics, or reflectors (e.g., a substrate or a portion of a substrate). Each device (e.g., light or LED) of the light source may be turned on and off.

The light sources may be illuminated in a sequence. The light sources may work together as a set of light sources to create light. All of the light sources may be a same color or provide a same color light or provide a lighting function of a vehicle. For example, all of the lights may be white or non-colored light. All of the light sources may be a single color light source.

The set of light sources function to fill a light bar, a lens, an outer housing, an outer lens, light blade, a substrate, an edge of a substrate, a side of a substrate, or a combination thereof so that light is projected outward to perform some function. The set of light sources may be a single function (e.g., a high beam, a low beam, a blending beam, a running light, a daytime light, a turn signal, a brake light, ornamentation, a display, signaling, or a combination thereof). Each set of light sources may perform a single function. The light sources may extend in a row, in a column, a straight line, or a combination of both (e.g., along a branch or branches). All of the lights within a set of light sources may provide the same light (e.g., color, color temperature, or wavelength). One set of light sources may include lights that may be yellow, orange, red, or white (e.g., OEM white, off white, pure white, or crystal white (e.g., having a color temperature between 4300K and 6000K)). The color, intensity, temperature, or a combination thereof within one light source may all be identical. The light from the light system may be directed to a predetermined location depending on a function of the light from that set of light sources. The light from the light sources may be directed outward from a vehicle so that the light is visible external of the vehicle. The light sources may be controlled my one or more controllers.

The controllers function to control the light sources or the lights within a light source individually. The controller may be part of the vehicle, part of the light system, or both. A single controller may control all of the lights. The controller may control branches. The controller may be free of controlling lights directly. The controller may illuminate (e.g., fire) the lights in a sequence, individually, in a pattern, a predetermined manner, a predetermined sequence, randomly, or a combination thereof. The controller may be programmable, include pre-set programs, or both. The controller may control the light system through a switch or through the primary light branch. The controller may communicate with an inside of the vehicle so that a notice may be provided to a user about a status of the light system. The controller may communicate with light sources through one or more printed circuit boards.

The light sources (and lights), branches, or both may be located on or connected to one or more printed circuit boards. The printed circuit boards (PCB) may provide electricity, power, signals, support, or a combination thereof to one or more light sources, or more branches, or both. The PCB may be fixed within a light system. Each PCB may be connected to a plurality of light sources. The PCB may be electrically connected, mechanically connected, or both to one or more light sources, branches, or both discussed herein. The PCBs may aim the light from the light sources. The PCBs may align a light source with a light guide or in a predetermined direction. One or more lights or light sources may be located on each light branch. Each light branch may include two or more lights or a plurality of lights.

The light branches each function to provide electricity to one or more lights or provide light to a predetermined location. The light branched may be a plurality of light branches. The plurality of light branches may all be in parallel. The light branches may each provide a same amount of light, receive a same amount of electricity, or both. The light branches within a single light system may all be powered in parallel. The light branches may be a primary light branch or a secondary light branch.

The primary light branch may function to control the light system. The primary light branch may function to turn off the light system if any of the secondary light branches fail. The primary light branch may include a bias circuit, a switch, or both. The primary light branch may be in communication with a controller. The primary light branch may be free of communication with a controller. The primary light branch may turn off the light system if any of the lights on the primary light branch fail or cease to operate properly. The primary light branch may complete a circuit within the light system. The primary light branch may be free of a notice circuit. The primary light branch may be electrically connected to two or more secondary light branched and preferably three or more secondary light branches.

The secondary light branches function to provide power, current, or both to lights so that the lights provide light to a region around a vehicle or to some of the light around a vehicle. The secondary light branches all extend parallel to one another. The secondary light branches are all substantially identical. Each of the secondary light branches may provide a same amount of light receive and a same amount of electricity. The secondary light branches may only provide light if all of the lights are operating normally. The secondary light branches may function independently of one another. The secondary light branches may all extend in parallel. Each of the secondary light branches may be connected to, controlled by, or both by the primary light branches. The secondary light branches may each include one or more notice circuits.

The notice circuit functions to communicate with a bias circuit. The notice circuit may provide notice through electricity. The notice circuit may be connected to one or more other notice circuits. The notice circuits may all work in conjunction to provide notice that each of the secondary light branches are operating properly. The notice circuits may provide notice that one or more of the light branches are not operating properly. The notice circuits may provide notice through current or voltage. Each notice circuit may provide a predetermined amount of electricity (e.g., current or voltage). The electricity (e.g., current or voltage) from the notice circuits may be added together and provided to the bias circuit, a switch or both. Each notice circuit may provide a predetermined amount of electricity to a switch. Each notice circuit may provide "X" amount of electricity (e.g., volts). Thus, the electricity of the respective notice circuits may be summed together. For example, if a system has 3 secondary circuits then the sum of the circuits may be 3X. If a system has "n" secondary circuits then the sum of the secondary circuits may nX. Each notice circuit may provide a voltage of about 50 millivolts or more, about 100 millivolts or more, about 500 millivolt or more, about 1 volt or more, or about 5 volts or more. Each notice circuit may provide voltage of about 100 volts or less, 70 volts or less, about 50 volts or less, about 20 volts or less, about 10 volts or less, about 7 volts or less, or about 5 volts or less. The notice circuit may include a primary path and a secondary path. The amount of electricity (e.g., voltage or current) along the primary path and the secondary path may be different. The amount of electricity (e.g., voltage or current) along the primary path and the secondary path may be substantially identical (e.g., within about ±3 mA).

The primary path, the secondary path, or both may extend from the line that supplies electricity to the bias circuit, the switch, or both. The secondary path may provide electricity to the primary light branch. The secondary path may only receive and provide some of the electricity. The secondary path may provide electricity that extends through a resistor to the bias circuit, the switch, or both.

The resistor may function to equalize an amount of electricity (e.g. voltage, current, or both) that extend through the primary path and secondary path. The resistors on each path may be substantially equal. The resistors may regulate the electricity so that substantially equal amounts of electricity extend through each of the paths (e.g., primary and secondary). The resistors may have a resistance of about 10 mΩ or more, about 100 mΩ or more, about 1Ω or more, about 5Ω or more, 10Ω or more, or about 100Ω or more. The resistors may have a resistance of about 10 kΩ or less, about 5 kΩ or less, about 1 kΩ or less, about 75Ω or less, or about 55Ω or less (e.g., about 50Ω). The resistance may be any resistance such that an amount of electricity (e.g., voltage, current, or both) extending through the secondary path and the primary path are substantially equal. The secondary path may receive some electricity and the primary path may receive some of the electricity and a sum of the electricity may equal all of the electricity. The secondary path may include one or more return diodes. The secondary path may include a single return diode.

The return diodes function to allow electricity to extend in a first direction but prevent electricity from extending in a second direction. The return diode may be any diode that permits one way flow of electricity in a circuit. The return diodes prevent electricity from extending through a second path (in a first direction) of the secondary path when the secondary light branch is operating properly. The return diodes may allow electricity to extend through a second path (in a second direction) of the secondary path when the secondary light branch is closed, a light fails, does not operate properly, or a combination thereof. The return diode may permit electricity to flow the resistor on the first path of the secondary path, to the primary path, or both. The return diode may reduce an amount of electricity (e.g., voltage) available to the bias circuit, the switch, or both. The return diodes may cause a reverse flow of electricity. For example, during a failure electricity cannot flow normally in a first direction to the primary path so the reverse diode permits electricity to flow in a second direction to the primary path.

The primary path may create a circuit for one or more of the light branches. Each light branch may include a primary path that completes a circuit for each of the light circuits individually. The primary light branch may have a primary path that controls all of the light branches. The primary path may bypass the secondary path. The secondary path may branch off of the primary path. The primary paths may all combine so that the electricity extends through the primary light branch. The primary path may only directly receive electricity when the light branch is functioning properly, the lights within a light branch are functioning properly, or both. Primary path indirectly receive electricity when the light branch is not functioning properly, a light within the branch is not functioning properly (e.g., is burned out), or both. The primary path may cach be in communication with a load balancing device.

The load balancing device functions to regulate the electricity so that each light branch receives a predetermined amount of electricity, a same amount of electricity, generate a same amount of light (e.g., light output), or a combination thereof. The load balancing device may equalize an amount electricity across each light branch. The load balancing device may be a bipolar transistor, a metal-oxide-semiconductor transistor (MOS), or both.

The bipolar transistor functions to equalize electricity between the light branches. For example, the bipolar transistors may only allow a predetermined amount of electricity to pass through so that each light branch has an equal amount of electricity. The bipolar transistors include a base, emitter, and collector. The MOS transistor may include a gate, source, and drain. The electricity from the bipolar transistors may extend around the bias circuit.

The bias circuit functions maintain the system on when a predetermined amount of electricity (e.g., voltage or current) extends into the bias circuit. The bias circuit may function to turn off the entire light system when any of the light branches fails, any of the lights fail, or both. The bias circuit may only be "on" or in a closed position or "off" or in an open position based on position of the switch (e.g., closed or on and open or off). The bias circuit may be off when no electricity is applied. Thus, the bias circuit may only close when power closed the circuit, otherwise the bias circuit may be open. A default of the bias circuit may be open or off. The bias circuit may include one or more switches.

The switches function to open and close. The switch may be a device that acts like a switch but does not actually move. The switch may electrically turn on and off or open and close. The switch when open may prevent the light system from providing light. The switches when closed may complete a circuit so that the light system provides light. The switch may be monostable. The switch may default to an off or open position. The switch may only close when a predetermined amount of electricity (e.g., voltage) is applied to the switch by the bias circuit. The switch may close when a predetermined amount of electricity or more is applied. The switch may open when less than a predetermined amount of electricity is applied. The switch may be selected based upon the number of light branches, the secondary light branches, or both. Thus, the switch as discussed herein may be switch-like. The switch may be transistor, a MOS transistor, a bipolar transistor, or a combination thereof.

FIG. 1A illustrates a side view of a vehicle 2 including light systems 10. The light systems 10 provide light around the vehicle 2. The light systems 10 includes lights 12 that are located at a fore 4 end of the vehicle 2 but could be located at an aft 6 of the vehicle 2. The light systems 10 may be controlled by one or more controllers 8 jointly or individually.

Figure 1B:
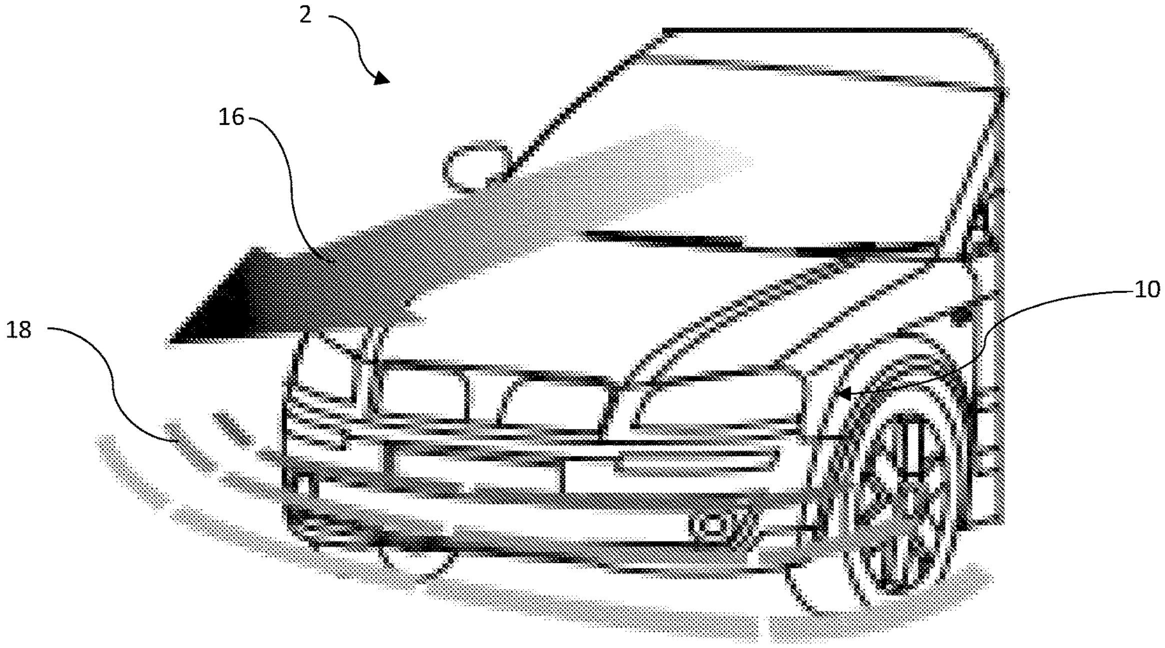
FIG. 1B is a front view of a vehicle and a light system.

FIG. 1B is a forward end of the vehicle 2. The forward end includes light systems 10 that faces in a direction of motion 16 and directs light in the direction 18 or is visible when facing a forward end of the vehicle 2 (or any other side/end of the vehicle 2 including a light system 10).

Figure 2A:
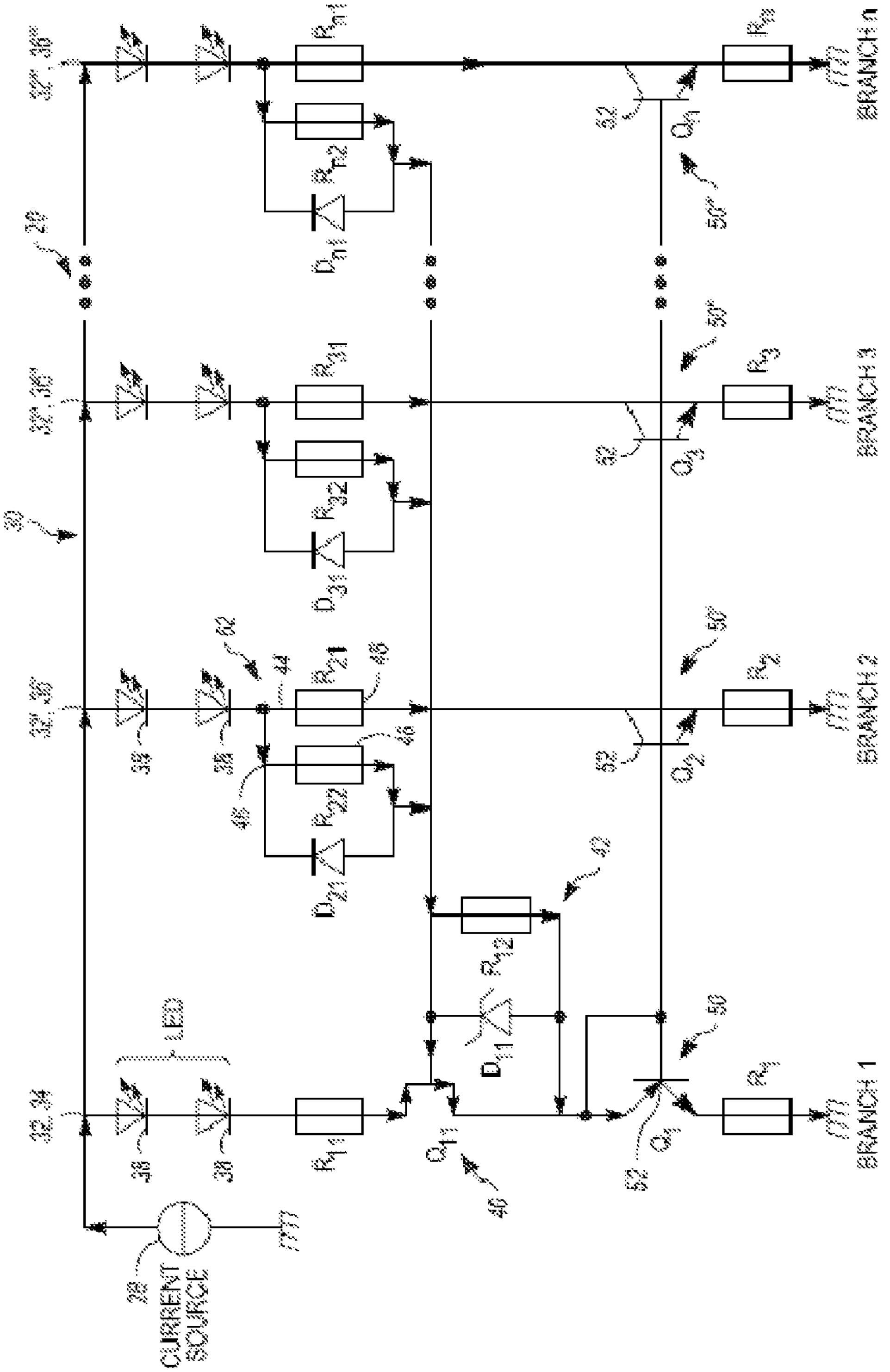
FIG. 2A illustrates schematic of a light system during normal operation.

FIG. 2A illustrates a circuit diagram 30 of a light system 10. The light system includes a power system 28 that provides electricity (e.g., power, voltage and/or current) to light branches 32, 32', 32'', and 32'''. Each of the light branches 32, 32', 32'', and 32''' include one or more light emitting diodes 38 that are powered by the current from the power system 28. The light system may include "n" number of branches and as shown there are four branches. The light branch 32 is a primary light branch 34. The light branches 32', 32'', and 32''' are secondary light branches 36', 36'', and 36''' respectively that are all in parallel and electrically connected to the primary light branch 34. All of the light branches 32, 32', 32'', and 32''' include light emitting diodes 38 that produce light when powered. The power after extending through and powering the light emitting diodes 38 extends into a notice circuit 62 where the power splits between a primary path 44 and a secondary path 46. The primary path 44 includes a resistor 48 ($R_{21}$) and the secondary path 46 includes a resistor 48 ($R_{22}$). The power from the primary path 44 extends to a load balancing device 50 to ensure that. The power from the secondary path 46 is directed towards the primary light branch 34 and to the bias circuit 42.

If a light emitting diode 38 on a given branch (e.g., branch 32') fails or burns out then the entire branch (e.g., 32') will fail. The failure of one branch (e.g., branch 32') will cause the switch 40 to bias to an off or open position. The primary light branch 34 includes the switch 40 within a bias circuit 42. If a predetermined amount (e.g., 3X current) of current from the secondary paths 46 is directed to a closed side of the switch 40 the switch 40 is moved or held in an on or closed position so that the entire light system 10 is on. For example, each branch 32', 32", and 32'" may provide a predetermined amount of current (X) such that if full current is not provided by each of the branches 32', 32", and 32'" (i.e., 3X) the switch will not be held in a closed position so that the light system 10 will be turned off.

The primary paths 44 provide current from each of the light branches 32, 32', 32", and 32'" through the one or more load balancing devices 50, 50', 50", and 50'" respectively. As shown, the load balancing devices 50, 50', 50", and 50'" are all bipolar transistors 52 that ensure equal amounts of current and/or power are directed through each of the light branches 32, 32', 32", and 32'".

Figure 2B:
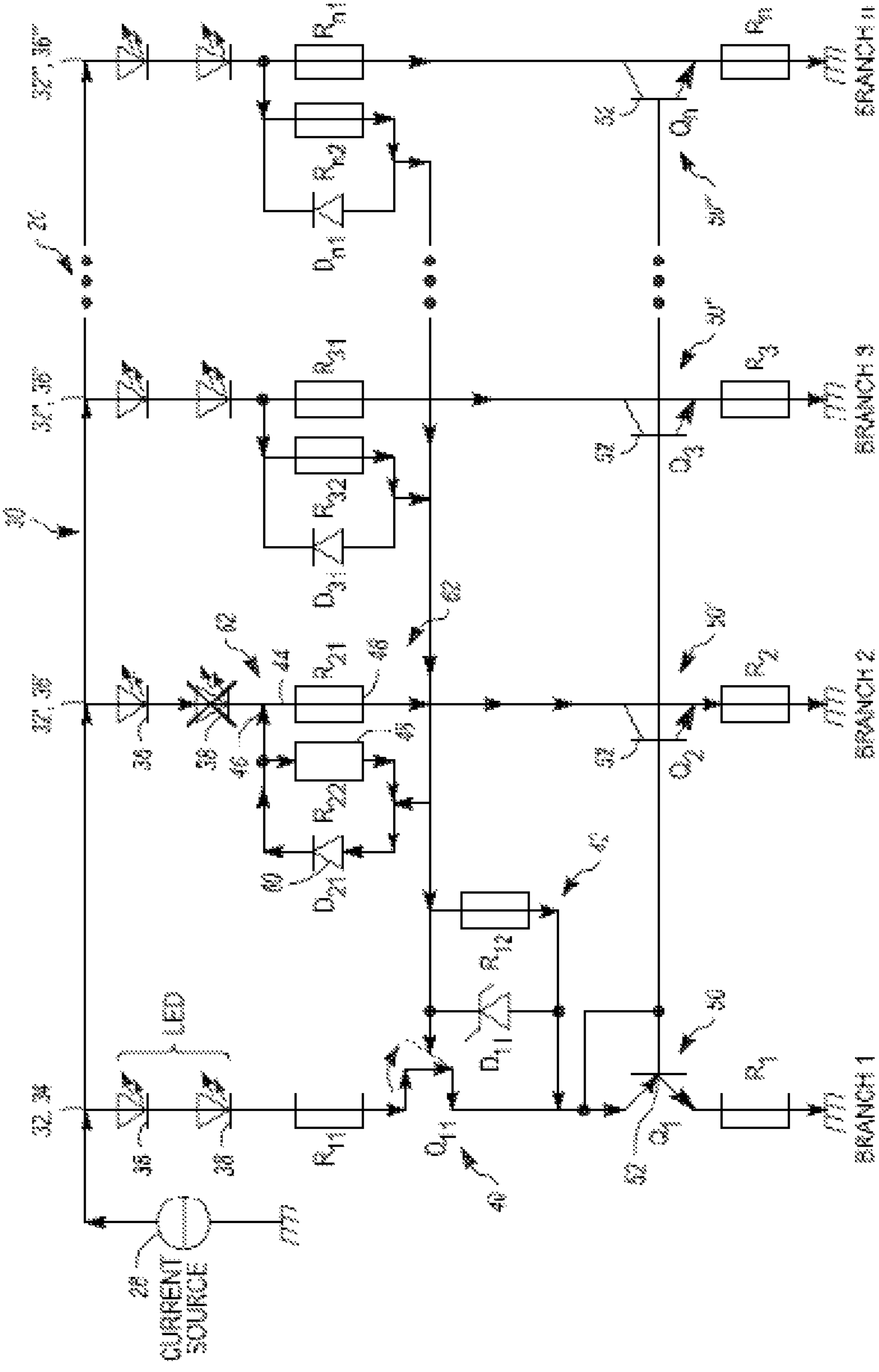
FIG. 2B illustrates a schematic of the light system of FIG. 2A when a light fails.

FIG. 2B illustrates a failure of one of the diodes 38 within the light branch 32'. When the diode 38 fails current from the power source 38 bypasses the light branch 32' and does not extend directly into the light branch 32' and notice circuit 62 through the primary path 44. Power from the adjacent light branches 32" and 32'" extends into the notice circuit 62 through the secondary paths 46 towards the bias circuit 42. Some of the current from the secondary paths 46 of the light branches 32" and 32'" extends into the secondary path 46 of branch 32'. The power, once in the secondary path 46, is split between the resistor 48 ($R_{22}$) and the return diode 60 ($D_{21}$). The return diode 60 ($D_{21}$) only allows power to flow one direction such that power only flows through the return diode 60 ($D_{21}$) when a failure occurs. When a failure occurs the return diode 60 ($D_{21}$) returns power into the primary path 44. The power then is redirected along the primary path 44 towards the load balancing device 50'. Since power is not directly directed into the light branch 32', the bias circuit 42 and switch 40 will experience less than the predetermined amount of current (e.g., 3×) such that the switch 40 is not opened or held open. By the switch 40 opening a complete circuit is not formed and the entire light system 10 turns off.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore
6 Aft
8 Controller
10 Light System
12 Lights
16 Direction of Motion
18 Light Direction
28 Power Source
30 Circuit Diagram
32 Light Branch
34 Primary Light Branch
36 Secondary Light Branch
38 Light Emitting Diode
40 Switch
42 Bias Circuit
44 Primary Path
46 Secondary Path
48 Resistor
50 Load Balancing Device
52 Bipolar Transistor
60 Return Diode
62 Notice Circuit

I claim:

1. A light system comprising:

a plurality of light branches extending in parallel to one another with each of the plurality of light branches comprising one or more lights that provide light to a region around a vehicle, the plurality of light branches comprising:

a primary light branch comprising:

a bias circuit and a switch; and secondary light branches that are controlled by the primary light branch, wherein the secondary light branches comprise a notice circuit that comprises a primary path and a secondary path;

wherein electricity is provided to the plurality of light branches and when all of the one or more lights on the plurality of light branches are operating properly the electricity maintains the switch, in the bias circuit, in a closed position where all of the one or more lights remain on;

wherein when any of the one or more lights fail or are not operating properly, electricity is prevented from extending through the light branch, by the one or more lights that have failed or are not operating properly, and the electricity continues to extend through the plurality of light branches that are operating properly so that the electricity that extends to the switch is not sufficient to maintain the switch in the closed position and the switch moves to an open position where the light system is turned off; and wherein the electricity extends through all of the secondary light branches when each of the one or more lights along the secondary light branches are operating properly so that some of the electricity extends along the primary path and some of the electricity extends along the secondary path.

2. The light system of claim 1, wherein when one of the secondary light branches fail, electricity is prevented from extending through the secondary light branch that failed so that the electricity is prevented from directly extending along the primary path and the secondary path.

3. The light system of claim 1, wherein when one of the secondary light branches fail, electricity is prevented from directly extending into the notice circuit and some electricity indirectly extends into the notice circuit from the secondary light branches that are operating properly.

4. The light system of claim 1, wherein the primary path includes a resistor.

5. The light system of claim 4, wherein the secondary path includes the resistor and a diode.

6. The light system of claim 1, wherein the plurality of light branches include one of the primary light branches and two or more secondary light branches.

7. The light system of claim 6, wherein each of the two or more secondary light branches include a primary path and a secondary path that the electricity is directed through each of the secondary light branches.

8. The light system of claim 1, further comprising:

a return diode that prevents power from flowing backwards when the system is turned off.

9. A light system comprising:

a plurality of light branches extending in parallel to one another with each of the plurality of light branches comprising one or more lights that provide light to a region around a vehicle, the plurality of light branches comprising:

a primary light branch comprising:

a bias circuit and a switch; and secondary light branches that are controlled by the primary light branch, wherein each of the secondary light branches comprise a resistor, a diode, and a notice circuit that each comprise a primary path and a secondary path;

wherein electricity is provided to the plurality of light branches and when all of the one or more lights on the plurality of light branches are operating properly the electricity maintains the switch, in the bias circuit, in a closed position where all of the one or more lights remain on; and wherein when any of the one or more lights fail or are not operating properly, electricity is prevented from extending through the light branch, by the one or more lights that have failed or are not operating properly, and the electricity continues to extend through the plurality of light branches that are operating properly so that the electricity that extends to the switch is not sufficient to maintain the switch in the closed position and the switch moves to an open position where the light system is turned off, wherein the resistor and the diode of the secondary path extend in parallel.

10. The light system of claim 9, wherein the primary path includes a primary resistor and the secondary path includes a secondary resistor and a resistance of the primary resistor is substantially equal to a resistance of the secondary resistor.

11. The light system of claim 9, wherein each of the secondary light branches provide a predetermined amount of current to the switch resulting in a switch current or voltage that maintains the switch in a closed position so that the light system remains on.

12. The light system of claim 9, wherein when one of the secondary light branches fail, electricity is prevented from extending through the secondary light branch that failed so that the electricity is prevented from directly extending along the primary path and the secondary path.

13. The light system of claim 9, wherein when one of the secondary light branches fail, electricity is prevented from directly extending into the notice circuit and some electricity indirectly extends into the notice circuit from the secondary light branches that are operating properly.

14. The light system of claim 9, wherein the diode is a return diode that prevents electricity from extending through the second path of the secondary light branch that failed.

15. A light system comprising:

a plurality of light branches extending in parallel to one another with each of the plurality of light branches comprising one or more lights that provide light to a region around a vehicle, the plurality of light branches comprising:

a primary light branch comprising:

a bias circuit and a switch; and secondary light branches that are controlled by the primary light branch;

wherein electricity is provided to the plurality of light branches and when all of the one or more lights on the plurality of light branches are operating properly the electricity maintains the switch, in the bias circuit, in a closed position where all of the one or more lights remain on; and wherein when any of the one or more lights fail or are not operating properly, electricity is prevented from extending through the light branch, by the one or more lights that have failed or are not operating properly, and the electricity continues to extend through the plurality of light branches that are operating properly so that the electricity that extends to the switch is not sufficient to maintain the switch in the closed position and the switch moves to an open position where the light system is turned off, wherein each of the secondary light branches provide a predetermined amount of current to the switch resulting in a switch current or voltage that maintains the switch in a closed position so that the light system remains on; and wherein a current or a supplied to the switch when the one or more lights that have failed is the switch current or voltage minus one of the predetermined amounts of the current or the voltage.

16. The light system of claim 15, wherein each of the secondary light branches comprise a notice circuit.

17. The light system of claim 16, wherein each of the notice circuits comprise:

a primary path and a secondary path.

18. The light system of claim 15, wherein the primary path includes a resistor.

19. The light system of claim 18, wherein the secondary light branches include the resistor and a diode.

20. The light system of claim 19, wherein the diode is a return diode that only allows power to flow in one direction.

* * * * *